United States Patent
Cozza et al.

(10) Patent No.: US 8,794,899 B2
(45) Date of Patent: Aug. 5, 2014

(54) LIFTING SYSTEM FOR DISPLAY CASES

(76) Inventors: Frank Charles Cozza, Santee, CA (US); Gerry Taylor, Carlsbad, CA (US)

( * ) Notice: Subject to any disclaimer, the term of this patent is extended or adjusted under 35 U.S.C. 154(b) by 472 days.

(21) Appl. No.: 12/359,257

(22) Filed: Jan. 23, 2009

(65) Prior Publication Data

US 2009/0185885 A1   Jul. 23, 2009

Related U.S. Application Data

(60) Provisional application No. 61/011,972, filed on Jan. 23, 2008.

(51) Int. Cl.
*B60P 1/02* (2006.01)
*B60P 3/00* (2006.01)
*B62B 3/10* (2006.01)

(52) U.S. Cl.
USPC .......................... 414/458; 280/79.11; 254/2 R

(58) Field of Classification Search
USPC ......................................................... 414/458
See application file for complete search history.

(56) References Cited

U.S. PATENT DOCUMENTS

| | | | | |
|---|---|---|---|---|
| 4,699,391 A * | 10/1987 | Syring | ........................ | 280/79.11 |
| 4,921,264 A * | 5/1990 | Duffy | ......................... | 280/79.11 |
| 4,934,893 A * | 6/1990 | Johnson | ........................ | 414/458 |
| 5,193,828 A * | 3/1993 | Benvenuti | .................. | 280/43.24 |
| 5,716,186 A * | 2/1998 | Jensen et al. | .................... | 414/458 |
| 7,311,487 B1 * | 12/2007 | Crossley et al. | ......... | 414/331.06 |
| 7,438,301 B2 * | 10/2008 | Schilling et al. | ............. | 280/79.7 |
| 8,672,296 B2 * | 3/2014 | Cozza et al. | ................... | 254/2 R |
| 2003/0215314 A1 * | 11/2003 | Klokke | ......................... | 414/495 |
| 2010/0111657 A1 * | 5/2010 | Tamborini et al. | ............ | 414/458 |
| 2010/0196128 A1 * | 8/2010 | Arensdorf et al. | ............ | 414/458 |

* cited by examiner

*Primary Examiner* — James Keenan
(74) *Attorney, Agent, or Firm* — Donn K. Harms

(57) ABSTRACT

A system for lifting of store shelves with merchandise on the shelves. The system employs a lifting member formed of two opposing cross members which sandwich support members of store shelving therebetween. Projecting forks from the two cross members engage sleeves on opposite sides of leveling feet which project from the support member of the shelf toward the floor. Jacks engaged to both sides of each lifting member elevate the shelf with the lifting members in engagement with each support member of the shelf.

18 Claims, 5 Drawing Sheets

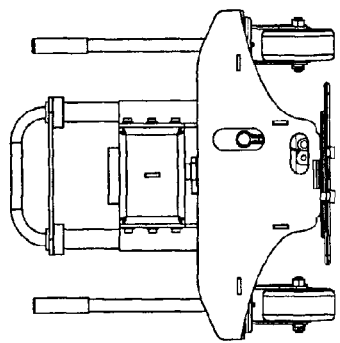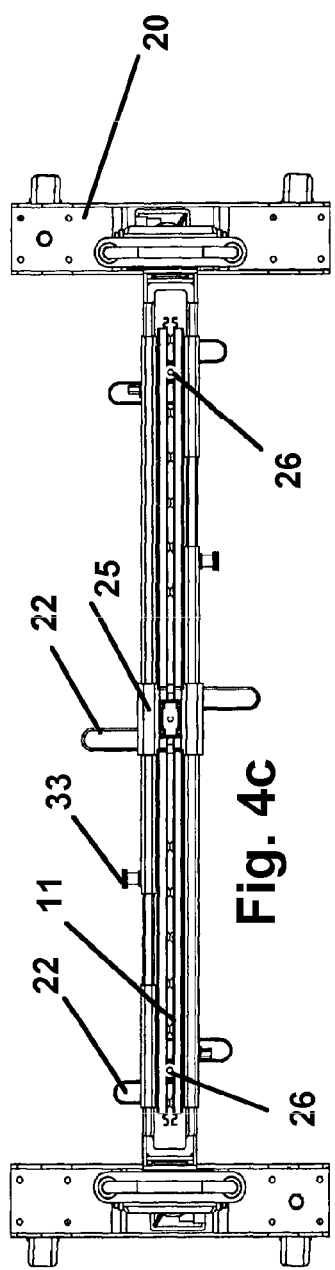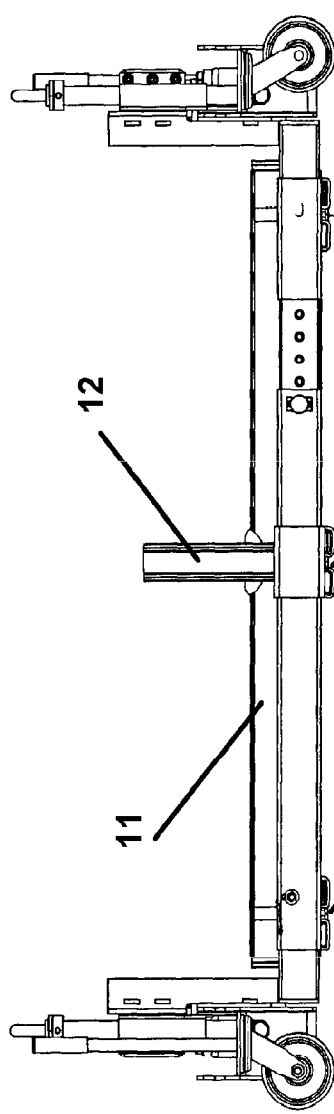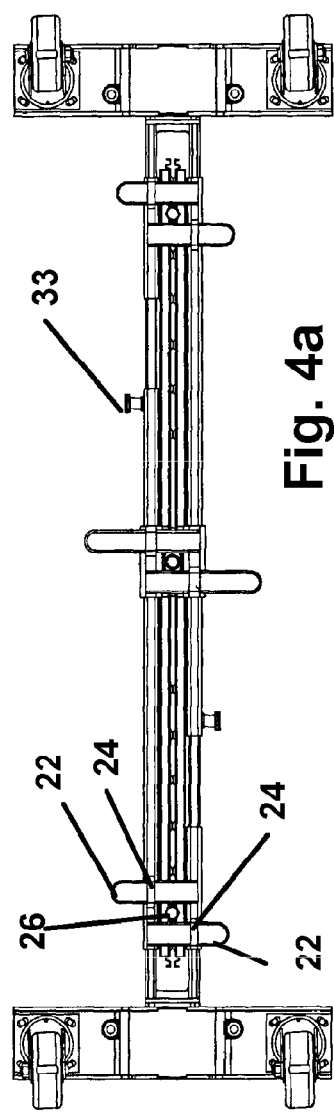

LIFTING SYSTEM FOR DISPLAY CASES

This application claims the benefit or U.S. Provisional Patent Application Ser. No. 61/011,972, filed Jan. 23, 2008, and incorporated herein in its entirety by reference.

BACKGROUND OF THE INVENTION

1. Field of the Invention

The present invention relates to lifting components for shelving. More particularly, it relates to an adjustable member adaptable to engage large storage and display structures such as retail store display cases commonly known as gondolas, which employ a system of legs for support of shelves on a floor surface.

2. Prior Art

Storage and display shelving and cases are conventionally employed to display goods for customers visiting the store. Because floor space in most retail stores is at such a premium, and in order to conserve floor space in retail and commercial situations and to provide better viewing and access to products, shelving is commonly employed to hold products. In a retail setting such shelving is generally arranged to form aisles for customers to traverse through adjacent shelf structures. The vertically stacked shelves in this configuration give the customers and users a much better view of the products being stored and allow for much more merchandise to be displayed above a small footprint on the floor.

All such shelving and cabinets must be structurally configured to support the load of merchandise intended. This structural support, being generally metal, makes the shelving heavy. The elevated inventory on the shelves can increase the total weight of the shelf supporting it to a multiple many times that of the shelf itself.

A vexing problem of such shelving, by nature of its need to support a load, is the elevated weight rendering the shelves ungainly. This is especially true when such shelving is loaded with heavy products for sale such as canned goods in a supermarket or in warehouse situations where large heavy articles are stored on very tall shelves.

A variety of jacks and dollies have been introduced in the past, most of which pertain to the lifting of shelving which employs vertical support legs with an adjustable leveling foot extending from a bottom end. However, most conventional products used for this purpose fail to provide a unified system of components, to lift, move, and subsequently re-place the shelf in position. Instead, conventional systems employ various jacks, forklifts and such for the purpose. This results in much time wasted and often damaged shelving from the ill-designed devices employed.

This is especially true when the moving of shelves is required during the remodeling or renovation of retail stores such as grocery stores, drug stores and the like. Warehouses are also frequently reorganized and require movement of the ungainly pallet holding shelves which hold heavy elevated loads.

During such a reorganizing or remodeling process it is often necessary to move pallet type shelving or large display cases, conventionally known as gondolas, which hold everything from tooth paste to canned soup. Moving them generally requires repositioning the shelves or gondolas from one part of the store to another. Often during a store remodeling or warehouse reorganizing process, the shelves will need to be moved multiple times to allow for various phases of construction and repositioning of merchandise to new locations.

The placement of heavy products on the shelves in an elevated position from the floor also makes the shelves ungainly and predisposed to tip when elevated with products remaining on the shelves. However, with the cost of labor and time involved, removing and replacing the products each time the display case is to be relocated can be especially expensive and can also play havoc with the short time schedules allotted for the remodeling process to minimize lost sales. As such, the ability to move display cases and other heavy storage devices while fully loaded with products or other stored items is highly desirable.

Various dollies and jacks have been provided in the past for lifting and moving such shelving. Consequently, transport by floor jack or flat dollies is not an option. However such lifting devices generally only engage part of the shelf being lifted placing great strain on the shelf structural components which may not have been originally intended by the shelf manufacturer.

As a consequence, there is a continuing unmet need for an improved device and system of components which provides for easy, quick, and safe movement of large heavily loaded pallet shelving in warehouses and store display cases and gondolas. Such a system should be easily customized to lift different shelves having different widths. Additionally, such a system should engage cross members of the shelf being lifted in a manner to allow the members to fully support the load of the shelf as designed and not risk structural failure by attaching to only a portion thereof.

SUMMARY OF THE INVENTION

The device and method herein disclosed and described achieves the above-mentioned goals through the provision of an adaptive lifting system which provides for a full length engagement of foot-elevated cross members conventionally employed to support such shelving. Using a system of length-adjustable lifting members, which adapt to engage cross members of the existing shelf, and concurrently engage around projecting leveling feet of the existing shelf, the device and method herein allow for lifting and movement of such shelves while fully loaded. Engaging a plurality of small wheeled dollies to the lifting members once securely engaged to the existing shelves, allows for the heavy and loaded shelves, to be easily moved at will.

The lifting members are especially well adapted to the task at hand in that each is formed of a pair of members which engage around the projecting leveling feet of the shelf to provide a full support of the shelf cross member during lifting. This engagement also allows for the adjustment feet to reposition on the floor subsequent to being lifted to support the shelf.

In one mode of the device, the device members supporting the existing shelf cross members are adjustable for length and for the on-site engagement around the projecting leveling feet extending below the shelf cross members to the floor. The two cross members are adapted to easily lock in an engagement to form a single lifting member using projecting forks on each cross member to engage sleeves in the opposite cross member forming the lifting member. The forks are slidably engaged to allow positioning on opposing sides of each leveling foot of the shelf member allowing these feet to stay in place for the duration of the move. Once engaged to the existing shelf, the lifting member formed of the two cross members is easily engaged to a dolly having a jack to elevate lifting members and the shelf and move it about the venue, even when loaded with merchandise upon it.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art.

Also, it is to be understood that the phraseology and terminology employed herein are for the purpose of description and should not be regarded as limiting. As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of this invention to provide an improved system for the moving of shelving and storage racks and the like that provides lifting members which fully engage the horizontal cross members of the shelf.

It is an additional object of this invention to provide such a system wherein the lifting members are adapted to engage around the adjustable downward-projecting leveling feet extending from the horizontal members of the existing shelving to the floor.

A further object of this invention is the provision of such a lifting system wherein the formed lifting member is easily engaged to a dolly and jack to allow for lifting and transport of the shelf.

These together with other objects and advantages which become subsequently apparent reside in the details of the construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 4a-4c depict top side and bottom views of the formed lifting member engaged to a dolly.

FIG. 4d depicts a lifting dolly adapted to engage the distal ends of the formed lifting members.

DETAILED DESCRIPTION OF THE PREFERRED EMBODIMENTS OF THE INVENTION

Figure 1:
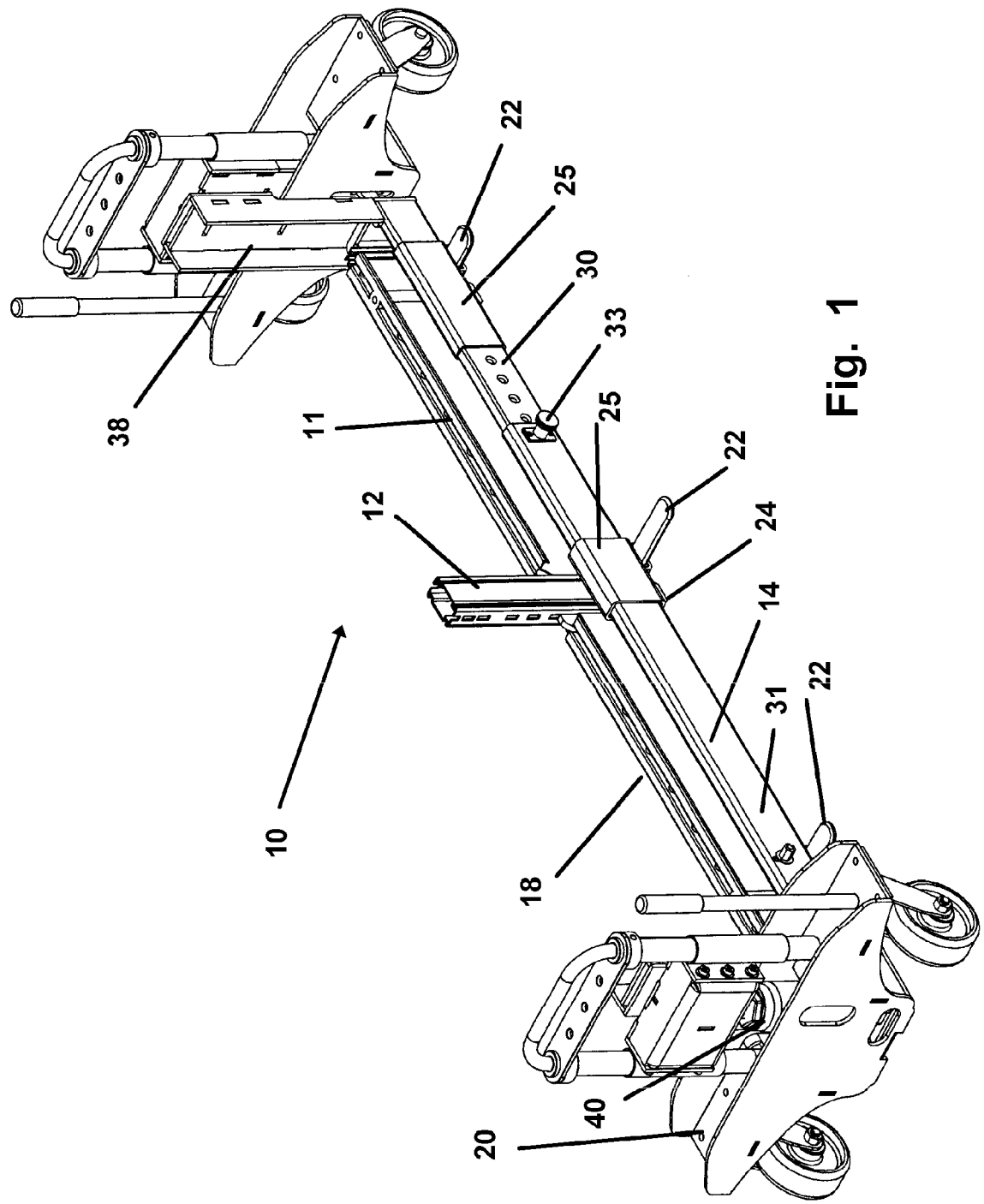
FIG. 1 depicts a perspective view of a preferred mode of the device showing the lifting member formed of two opposing cross members and dollies engaged to the lifting member.

Referring now to the drawings of FIGS. 1-5, the device 10 is depicted in various views which make the structure and function of the device 10 clear to those skilled in the art. As disclosed herein the device 10 is adapted to engage horizontal support beams 11 and support posts 12 of conventional gondolas and shelves for movement of the shelf with or without the merchandise thereon. Conventionally, such vertically disposed support posts 12 and horizontally disposed support beams 11, are generally hidden from view behind kick plates which extend between the lowest shelf of the structure and the floor supporting it.

FIG. 1 depicts a perspective view of a preferred mode of the device 10 showing the lifting member 14 formed of two opposing cross members 16 and 18 with engageable dollies 20 engaged to the lifting member 14.

Figure 2:
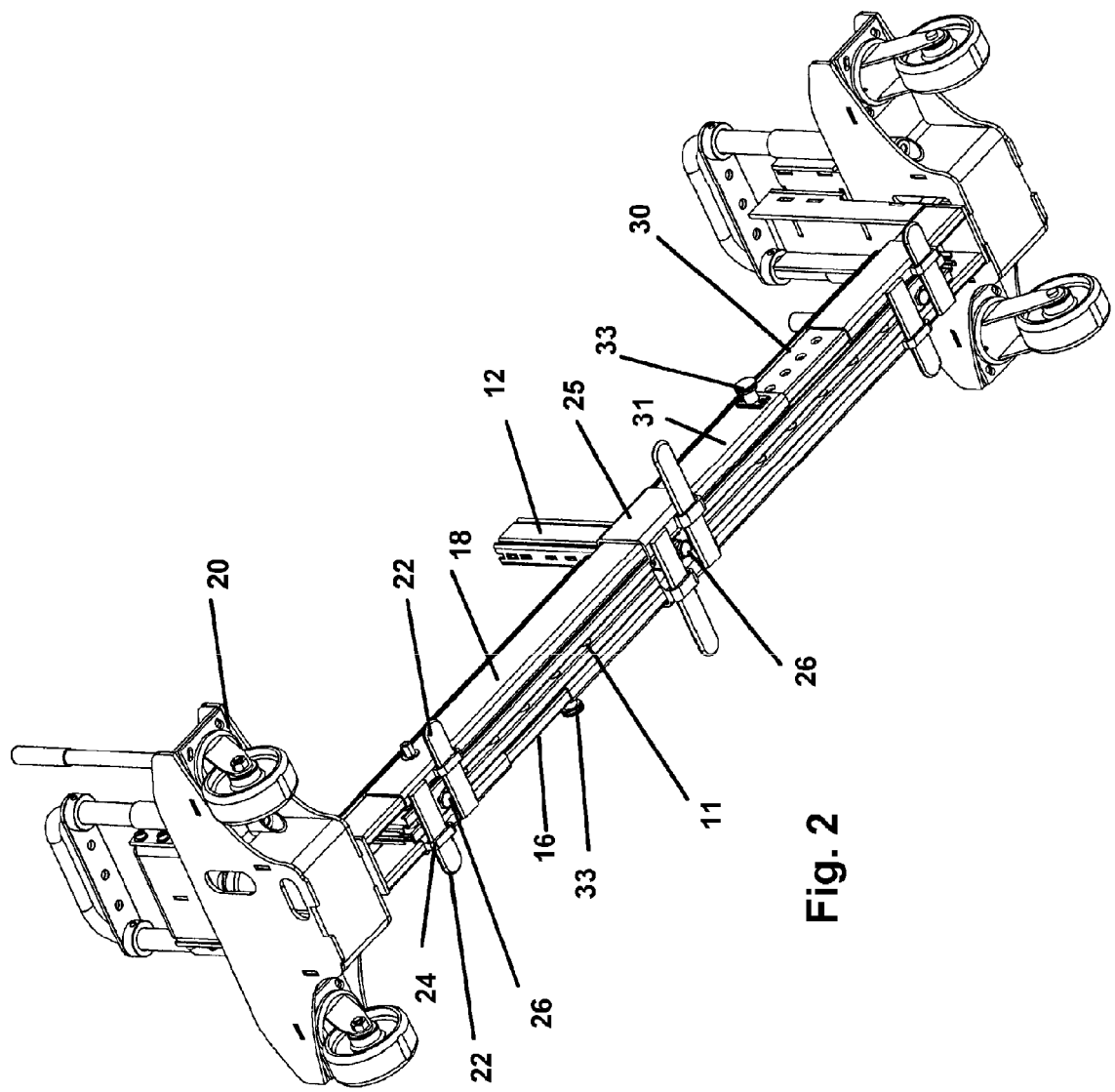
FIG. 2 is a perspective bottom view of the lifting member showing the projecting forks of two cross members forming the lifting member engaging sleeves on opposite sides of projecting leveling feet of the shelf cross member.

FIG. 2 is a perspective bottom view of the lifting member 14 showing the projecting forks 22 of two cross members 16 and 18 forming the lifting member 14 engaging sleeves 24 on opposite sides of projecting leveling feet 26 of the shelf beam 11. Such feet 26 are employed to level the shelf on the floor of the store and project between the floor and the shelf beam 11.

Figure 3:
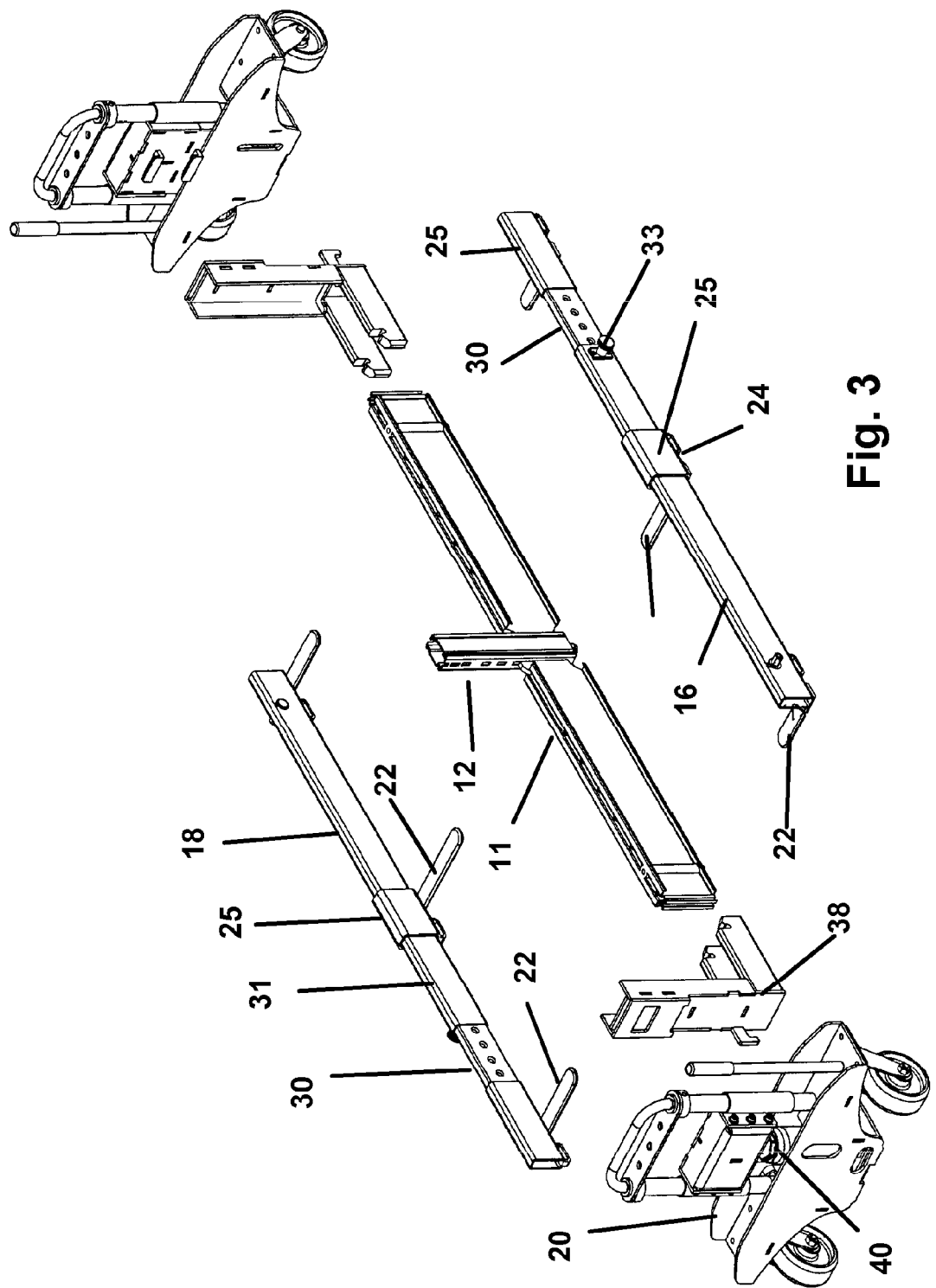
FIG. 3 shows an exploded view of the two cross members prior to engagement around a horizontal shelf member with the forks slidably adjusted to abut on either side of projecting leveling feet.

FIG. 3 shows an exploded view of the two cross members 16 and 18 positioned for an engagement around the horizontal shelf shelf beam 11 with the forks 22 slidably adjustable on the cross members 16 and 18 to allow adjustment to a positions to abut both sides of the projecting leveling feet 26 extending from the beam 11. In use, the two cross members 16 and 18 are adjusted for length by sliding a first component 30 in its translational engagement with a second component 31 and then sliding the forks 22 to the proper position to engage opposing sleeves 24 on the other cross member forming the lifting member 14. Once so adjusted the two cross members 16 and 18 are engaged in a sandwiched engagement around the horizontal shelf beam 11 with the forks 20 supporting the beam 11 at positions adjacent to each foot 26. Locating pins 33 serve to engage the first and second components of each cross member 16 and 18 at the correct length for the job.

Also shown in FIG. 3 are interfaces 38 adapted to engage the distal ends of the formed lifting member 14 and to engage with a dolly 20 which has a jack 40 engaged upon it. So engaged to the lifting member 14 the jacks 40 are activated to elevate the lifting member 14 and the shelf beam 11 and hence the shelf.

Of course those skilled in the art, on reading this disclosure will realize that other means to engage and lift both ends of the lifting member 14 when attached to the shelf beam 11 may be used since the beam 11 is engaged at the appropriate points to support the load of the shelf as intended. All such lifting means as would occur to those skilled in the are anticipated within the scope of this patent.

FIG. 4a-4c depict top side and bottom views of the formed lifting member 14 engaged to a dolly 20 and engaged in a sandwiched engagement around the horizontal shelf beam 11. The two cross members 16 and 18 are positioned by the slidable engagement of the forks 22 with opposing sleeves 24 at points immediately adjacent to the feet 26 extending below the beam 11. Length of the adjustable lifting member 14 is held by the locking pins 33 engaged with apertures 35 positioned and communicating through respective first components 30.

This sandwiched engagement of the lifting member 14 around the beam 11 is easily accomplished by removing the kick plate from the shelf if it has one, and sliding the properly lengthened cross members 16 and 18 under the shelf and then engaging the forks 22 of one cross member into the sleeves 24 of the other with the forks 22 and sleeves 24 slid to positions adjacent to the feet 26.

Figure 5:
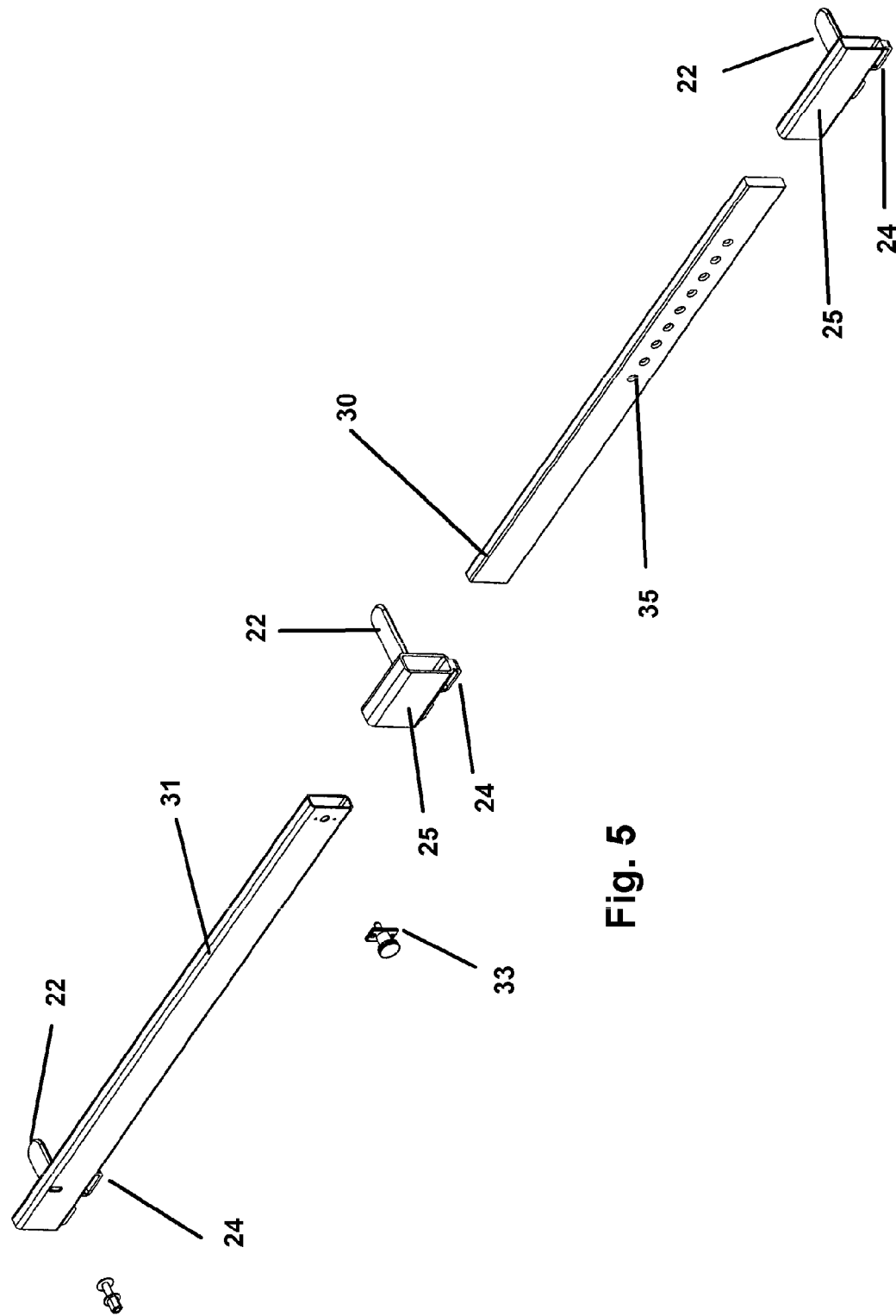
FIG. 5 shows an exploded view of one cross member of a pair which are slidably adjustable during assembly.

As can be discerned from FIG. 5, the sleeves 24 and forks 22 are on a slidable collar 25 to allow them to be translated to the proper positions and will move together so they will align with opposing sleeves 24 and forks 22. To obtain the proper length of the lifting member 14 initially the first component 30 and second component 31 of each member are translated in their slidable engagement to the proper position. Thereafter the locking pin 33 is engaged in an aperture 35. Subsequently the forks 22 are positioned and the two cross members 16 and 18 are engaged in their sandwiched attachment to the shelf horizontal beam 11.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the claims.

What is claimed is:

1. An apparatus for elevation and transport of store shelving supported by a support member, said apparatus comprising:
   a lifting member having two ends, said lifting member formed of two opposing cross members capable of being arranged in a sandwiched engagement with said support member of said shelving;
   said opposing cross members each having projecting forks connected thereto which are also connected to the opposing said cross member, said forks so engaged are adapted, in combination with said opposing cross members, to completely surround projecting leveling feet extending downward from said support member toward a floor;
   a pair of interfaces, each of said pair of interfaces comprising two ends, one end of each interface telescopically engaged to one end of said lifting member;
   a pair of jacks, each of said pair of jacks engaged to the other end of one of each of the pair of interfaces; and
   said pair of jacks cooperatively operable to elevate said lifting member while in engagement to said support member to elevate said shelving.

2. The apparatus of claim 1, wherein each of the two opposing cross members comprise two ends, wherein each of the two opposing cross members further comprises a first component and a second component.

3. The apparatus of claim 2, wherein said first component and said second component of each of the two opposing cross members are telescopically engaged.

4. The apparatus of claim 3, wherein said first component of each opposing cross member contains a plurality of apertures, wherein said second component of each opposing cross member has a pin attached thereto and wherein said pin attached to said second component of each opposing cross member is engageable into one of said plurality of apertures contained on said first component of each opposing cross member to slidably fix the telescopic engagement of said first component to said second component on each opposing cross member.

5. The apparatus of claim 2, wherein a first slidable collar and a second slidable collar on each opposing cross member are slidably engaged to each of the two opposing cross members.

6. The apparatus of claim 5, wherein said first slidable collar on each opposing cross member is located near an end of each opposing cross member, wherein said second slidable collar on each opposing cross member is located near a center portion of each opposing cross member, wherein one of said projecting forks is directly attached to a bottom surface of each of said first slidable collar and said second slidable collar on each opposing cross member, wherein an engaging sleeve is located on the bottom surface of each of said first slidable collar and said second slidable collar on each opposing cross member and wherein one of said projecting forks on said second slidable collar on one opposing cross member is slidably engaged within said engaging sleeve on said second slidable collar on the other opposing cross member.

7. The apparatus of claim 6, wherein one of said projecting forks is directly attached to said second component on each opposing cross member, wherein an engaging sleeve is located on a bottom surface of said second component on each opposing cross member and wherein one of said projecting forks directly attached to said first slidable collar on one opposing cross member is slidably engaged within said engaging sleeve on said second component on the other opposing cross member.

8. The apparatus of claim 1, wherein said one end of each of said pair of said interfaces engaged to one end of said lifting member further comprises a pair of horizontal members, wherein an end of each of said pair of horizontal members of each of said pair of interfaces is telescopically engageable with one end of one of said two opposing cross members.

9. The apparatus of claim 1, wherein each of said pair of jacks is supported by a dolly, wherein said the other end of each of said pair of said interfaces engaged to one of said pair of jacks further comprises a vertical member, wherein an upper end of said vertical member of eahc of said pair of interfaces is directly attached to one of said pair of jacks and a lower end of said vertical member of each of said pair of interfaces is connected to a base of said dolly, said connection of said lower end of said vertical member of each of said pair of interfaces to said base of said dolly being a protrusion in said lower end of said vertical member of each of said pair of interfaces being received within a slot within said base of said dolly.

10. An apparatus for elevation and transport of store shelving supported by a support member, said apparatus comprising:
    a lifting member having two ends, said lifting member formed of two opposing cross members capable of being arranged in a sandwiched engagement with said support member of said shelving;
    said opposing cross members each having a longitudinal axis, said opposing cross members slidably connected to each other in a direction substantially perpendicular to each longitudinal axis;
    a pair of jacks, each of said pair of jacks connected to one end of each of the two opposing cross members; and
    a plurality of forks and a plurality of engaging sleeves are connected to each of said two opposing cross members, wherein said plurality of said forks on one of said two opposing cross members is slidably connected to said plurality of engaging sleeves on the other of said two opposing cross members.

11. The apparatus of claim 10, further comprising:
    a pair of interfaces, each of said pair of interfaces comprising two ends, one end of each interface telescopically engaged to one end of said lifting member; and
    the other end of each of the pair of interfaces directly attached to one of each of said pair of jacks.

12. The apparatus of claim 10, wherein said plurality of forks connected to each of said two opposing cross members are capable of engagement with a bottom surface of said support member, said pair of jacks cooperatively adapted to allow said shelving supported by said support member and said plurality of forks to be lifted off a floor surface.

13. An apparatus for elevation and transport of store shelving supported by a support member, said apparatus comprising:
- a lifting member having two ends, said lifting member formed of two opposing cross members capable of being arranged in a sandwiched engagement with said support member of said shelving;
- said opposing cross members each having a longitudinal axis, said opposing cross members slidably connected to each other in a direction substantially perpendicular to each longitudinal axis;
- a pair of interfaces, each of said pair of interfaces comprising two ends, one end of each interface telescopically engaged to one end of said lifting member;
- a pair of jacks, each of said pair of jacks engaged to the other end of one of each of the pair of interfaces; and
- said pair of jacks cooperatively operable to elevate said lifting member while in engagement to said support member to elevate said shelving.

14. The apparatus of claim 13, wherein a plurality of forks and a plurality of engaging sleeves are connected to each of said two opposing cross members, wherein said plurality of said forks on one of said two opposing cross members is slidably connected to said plurality of engaging sleeves on the other of said two opposing cross members.

15. The apparatus of claim 14, wherein each of the two opposing cross members comprise two ends, wherein each of the two opposing cross members further comprises a first component and a second component.

16. The apparatus of claim 15, wherein said first component and said second component of each opposing cross member are telescopically engaged.

17. The apparatus of claim 14, wherein a first slidable collar and a second slidable collar are slidably engaged to each of the two opposing cross members.

18. The apparatus of claim 17, further comprising:
- said first slidable collar on each opposing cross member is located near an end of each opposing cross member;
- said second slidable collar on each opposing cross member is located near a center portion of the opposing cross member;
- one of said plurality of forks is directly attached to a bottom surface of each of said first slidable collar and said second slidable collar on each opposing cross member;
- wherein an engaging sleeve is located on the bottom surface of each of said first slidable collar and said second slidable collar on each opposing cross member;
- wherein one of said plurality of forks on said second slidable collar on one opposing cross member is slidably engaged within said engaging sleeve on said second slidable collar on the other opposing cross member;
- wherein one of said plurality of forks is directly attached to said second component on each opposing cross member;
- wherein an engaging sleeve is located on a bottom surface of said second component on each opposing cross member and wherein one of said plurality of forks directly attached to said first slidable collar on one opposing cross member is slidably engaged within said engaging sleeve on said second component on the other opposing cross member.

* * * * *